United States Patent [19]

Bacque et al.

[11] Patent Number: 5,095,081

[45] Date of Patent: Mar. 10, 1992

[54] PROCESS FOR THE MANUFACTURE OF VINYLIDENE FLUORIDE POLYMERS AND USE OF VINYLIDENE FLUORIDE POLYMERS FOR PAINT FORMULATION

[75] Inventors: Xavier Bacque; Pierre Lasson, both of Tavaux, France

[73] Assignee: Solvay & Cie, Brussels, Belgium

[21] Appl. No.: 489,493

[22] Filed: Mar. 7, 1990

[30] Foreign Application Priority Data

Mar. 15, 1989 [FR] France .................... 89 03497

[51] Int. Cl.⁵ .............. C08F 4/30; C08F 14/22; C08F 2/38
[52] U.S. Cl. .................... 526/216; 526/222; 526/255
[58] Field of Search ................ 526/216, 222, 255

[56] References Cited

U.S. PATENT DOCUMENTS

| | | | |
|---|---|---|---|
| 2,965,595 | 12/1960 | Brinker et al. | 526/216 |
| 3,031,437 | 4/1962 | Iserson | 526/216 |
| 3,032,543 | 5/1962 | Bro et al. | 526/216 |
| 3,069,401 | 12/1962 | Gallagher | 526/216 |
| 3,637,631 | 1/1972 | Sianesi et al. | 526/216 |
| 3,640,985 | 2/1972 | Stevens . | |
| 3,707,529 | 12/1972 | Gladding et al. | 526/216 |
| 3,714,137 | 1/1973 | Lienhard et al. . | |
| 4,524,197 | 6/1985 | Khan | 526/216 |
| 4,739,024 | 4/1988 | Moggi et al. | 526/216 |

FOREIGN PATENT DOCUMENTS

| | | | |
|---|---|---|---|
| 1939852 | 2/1971 | Fed. Rep. of Germany . | |
| 2358270 | 5/1974 | Fed. Rep. of Germany | 526/216 |
| 2347389 | 1/1975 | France | 526/216 |
| 805115 | 11/1958 | United Kingdom | 526/216 |
| 1149451 | 4/1969 | United Kingdom | 526/216 |

OTHER PUBLICATIONS

Abstract of Japanese Patent A-58-65-711, vol. 7, No. 155; Jul. 7th, 1983.

*Primary Examiner*—Joseph L. Schofer
*Assistant Examiner*—N. Sarofim
*Attorney, Agent, or Firm*—Spencer & Frank

[57] ABSTRACT

Process for the manufacture of vinylidene fluoride polymers by noncontinuous polymerization of vinylidene fluoride in an aqueous medium with the use of peroxydisulphates as initiators and in the absence of emulsifying agent, in which an alkyl acetate, employed as a chain-control agent, is introduced into the initial aqueous charge intended for the polymerization.

Use of the resulting vinylidene fluoride polymers for the manufacture of paints and, more particularly, of paints intended for prelacquering metal sheets with improved gloss.

11 Claims, No Drawings

PROCESS FOR THE MANUFACTURE OF VINYLIDENE FLUORIDE POLYMERS AND USE OF VINYLIDENE FLUORIDE POLYMERS FOR PAINT FORMULATION

The present invention relates to a process for the manufacture of vinylidene fluoride polymers, and to to the use of the resulting vinylidene fluoride polymers for the formulation of paints and, more particularly, of paints intended for prelacquering metal sheets.

It is known to employ vinylidene fluoride polymers for the formulation of paints and adherent coatings which withstand atmospheric agents and corrosion and, in particular, for the formulation of paints intended for prelacquering metal sheets, an operation frequently referred to by the term "coil coating". This type of paint is generally applied as a very thin coat in thicknesses not exceeding approximately 20 microns. Vinylidene fluoride polymers obtained by aqueous emulsion polymerization are usually called on for the formulation of such paints based on vinylidene fluoride polymers.

French Patent FR-A-2,056,636, in the name of suddeutsche Kalkstickstoff-Werke AG, describes a process for the manufacture of polyvinylidene fluoride as fine (primary) particles with a mean size of approximately 0.2 microns, suitable for the formulation of organosol varnishes intended for the protection of metals. The process in question consists in polymerizing vinylidene fluoride in aqueous medium, in the absence of an emulsifying agent, with the use of peroxydisulphates as initiators. This process is particularly attractive because of its simplicity and of the small number of polymerization ingredients needed for its use (essentially water, monomer and water-soluble initiator). It has turned out, nevertheless, that the polyvinylidene fluorides obtained according to the process of the abovementioned prior art produce paints and coatings with low gloss. In many applications in the field of paints and, in particular, paints for prelacquering metal sheets, it is of primary importance to have available high gloss paints.

The aim of the present invention is to provide an improved process for the manufacture of vinylidene fluoride polymers which can be employed for the formulation of paints with improved gloss.

To this end, the present invention relates to a process for the manufacture of vinylidene fluoride polymers by noncontinuous polymerization of vinylidene fluoride in aqueous media with the use of peroxydisulphates as initiators and in the absence of emulsifying agent, characterized in that a chain-control agent is introduced into the initial aqueous charge intended for the polymerization, the said chain-control agent being chosen from alkyl acetates whose alkyl groups contain 1 to 3 carbon atoms.

By way of examples of alkyl acetates which can be employed in the process of the invention there may be mentioned methyl, ethyl, propyl and isopropyl acetates. A very particularly preferred alkyl acetate is ethyl acetate.

It is essential, within the scope of the present invention, to use all the chain-control agent in the initial aqueous charge intended for the polymerization.

The quantity of chain-control agent to be used is not particularly critical. It depends, of course, on the molecular weight and therefore on the intrinsic viscosity which it is intended to impart to the polymer. In general, from approximately 0.5 to 3% by weight of control agent is employed relative to the monomer used. Within this concentration range, the quantity of control agent will be advantageously chosen by experiment as a function of th polymerization conditions and of the intended result. A generally preferred concentration range runs from 1 to 2% of control agent relative to the monomer used. In this concentration range, polyvinylidene fluorides are produced whose intrinsic viscosities, measured in dimethylformamide at 25° C, are between approximately 0.12 and 0.005 g/l.

In the process according to the invention the polymerization is initiated by initiators of the peroxydisulphate type. By way of examples of such peroxydisulphates there may be mentioned peroxydisulphates of alkali metals such as sodium and potassium, and ammonium peroxydisulphate. Ammonium peroxydisulphate is preferably employed.

The quantity of initiator used in the polymerization can vary within certain limits. It is nevertheless advisable to employ at least 0.005 g/l of aqueous phase and not more than 0.5 g/l of aqueous phase. The initiator concentration is preferably between approximately 0.03 and 0.2 g/l of aqueous phase. The initiator may be present wholly or partially in the initial aqueous charge. According to a preferred embodiment of the invention all the peroxydisulphate is introduced progressively into the charge in the course of polymerization.

The polymerization temperature is not critical. Nevertheless, it lies advantageously in the range approximately from 80 to 95° C. In the abovementioned temperature range vinylidene fluoride is above its critical temperature (30.1° C.), so that the operating pressure depends essentially on the temperature and on the quantity of monomer present in the polymerization vessel. For output efficiency reasons the polymerization pressure lies advantageously above 20 bars and preferably approximately between 30 and 45 bars. It is controlled and maintained by the progressive introduction of vinylidene fluoride. The total quantity of vinylidene fluoride introduced does not generally exceed 0.22 parts per 1 part by weight of water.

A preferred embodiment of the process of the invention consists, therefore, in introducing all the chain-control agent (alkyl acetate) into the initial aqueous charge intended for the polymerization and in introducing the initiator and vinylidene fluoride progressively into the charge in the course of polymerization, the latter compound being introduced in a sufficient quantity to maintain the pressure at the chosen value.

Vinylidene fluoride polymerization is intended within the scope of the present invention to denote the homopolymerization of vinylidene fluoride and the copolymerization of mixtures of monomers with a preponderance, preferably more than 85 mol%, of vinylidene fluoride, such as, for example, mixtures of vinylidene fluoride with other fluoroolefins, such as vinyl fluoride, trifluoroethylene, chlorotrifluoroethylene, tetrafluoroethylene and hexafluoropropylene. Nevertheless, preference is given to the homopolymerization of vinylidene fluoride.

When the polymerization has ended, the process according to the invention results in aqueous dispersions of finely divided vinylidene fluoride polymers whose primary particles, uniformly spherical, exhibit a mean size of approximately 0.1 to 0.3 microns. The vinylidene fluoride polymers obtained according to the process of the invention are isolated from the polymerization medium in the usual manner and, in particular, by coagulation, filtration, washing and drying.

With a view to their use for the formulation of paints, the coagulates are milled, during or after drying, so as to obtain vinylidene fluoride polymers as particles whose mean size is below 20 microns.

The vinylidene fluoride polymers obtained according to the process of the present invention are very particularly suitable for the formulation of gloss paints. The use of these polymers for the formulation of paints consequently forms another aspect of the present invention and, in particular, for the formulation of paints intended for the prelacquering of metal sheets.

In addition to the polyvinylidene fluoride and organic solvents used as a dispersion medium (such as ketones, phthalates and acetates), formulations of paints based on polyvinylidene fluoride usually include a resin, such as an acrylic resin, which is compatible with polyvinylidene fluoride and more soluble than polyvinylidene fluoride in the said solvents, and intended to improve its dispersion in the paint, as well as pigments and surface-active agents.

The examples which follow are intended to illustrate the invention.

Examples 1 to 3, according to the invention, illustrate the use of ethyl acetate as a chain-control agent. Example 4, for reference, illustrates the process of the prior art (without chain-control agent).

Examples 1 to 4 are carried out according to the following general operating procedure:

Polymerization

Into a stainless steel autoclave of 35-litre capacity are introduced successively 25 litres of deionized water, followed by ethyl acetate in quantities specified in the appended Table I. The autoclave is closed and flushed with nitrogen. The contents of the autoclave are heated to 92° C. Vinylidene fluoride is injected and the flow rate of vinylidene fluoride is controlled so as to establish and maintain a pressure of 35 bars in the autoclave. Ammonium peroxydisulphate is injected continuously as a 10 g/l aqueous solution at a rate of 77 cm$^3$/hour. After 5.63 kg of vinylidene fluoride have been injected the polymerization is stopped by interrupting the injection of vinylidene fluoride and of catalyst, and the heating is then turned off and the autoclave is degassed. The latex (approximately 0.2-micron primary particles) is coagulated with sodium chloride, filtered, washed and dried at 60° C. 5.5 kg of polyvinylidene fluoride are recovered. The coagulate is milled so as to obtain a polymer whose mean particle size is below 20 microns.

The intrinsic viscosities, measured in dimethylformamide at 25° C., of the polyvinylidene fluorides obtained according to Examples 1 to 3 are recorded in Table I, attached. The intrinsic viscosity of the polyvinylidene fluoride obtained according to Example 4, for reference, that is to say in the absence of alkyl acetate, could not be measured, owing to inadequate solubility in dimethylformamide.

EVALUATION

The polyvinylidene fluorides obtained according to Examples 1 to 4 are evaluated in a white paint formulation whose composition is described below:

| | Parts by weight |
|---|---|
| Resins: polyvinylidene fluoride | 24.9 |

-continued

| | Parts by weight |
|---|---|
| acrylic resin | 10.7 |
| Pigment: titanium oxide | 14.3 |
| Solvents: isophorone | 35.6 |
| diethyl phthalate | 6.6 |
| Cellosolve acetate | 5.0 |
| Anionic surfactant (*) | 2.9 |

(*)solution containing 5% active substances in diacetone alcohol

2. Lacquering an aluminium panel

The white paint formulated as above is applied onto a 0.6 mm thick aluminium panel. To promote the adhesion of the polyvinylidene fluoride coating, a coat of phenoxy resin-based primer paint is applied first of all at a dry film thickness of approximately 5 microns and the phenoxy coating is cured by placing the panel in an oven so as to reach a temperature of 232° C. over a period of time not exceeding a minute (29 s in this case). The panel is then withdrawn from the oven and immediately plunged into a cold water bath. After drying the cold panel, the white paint is applied by means of a wire spreader so as to obtain a dry film thickness of 20 microns and the paint is crosslinked by placing the panel in an oven so as to attain a temperature of 254° C. over a period of time not exceeding a minute (34 s in this case). The panel is withdrawn from the oven and cooled in a water bath before being dried.

3. Gloss measurement

The gloss of the white paints is measured by means of a specular glossmeter in accordance with ISO standard 2813-1978, the angle of incidence of the light beam being equal to 60°. The principle of this evaluation consists in measuring the ratio of the luminous flux reflected by the sample at an angle of 60° to the luminous flux reflected by a polished black glass (refractive index 1.567) to which a gloss of 100 is assigned.

The results of the evaluation of gloss, expressed in % relative to the gloss of a polished black glass to which a gloss of 100 is assigned, are also recorded in Table I, appended.

Comparison of the results of Examples 1 to 3, according to the invention, with those of Example 4, for reference, shows the marked improvement in the gloss of the paints formulated with polyvinylidene fluoride manufactured with the use of ethyl acetate as chain-control agent.

TABLE I

| Example No. | Quantity of ethyl acetate, g | Intrinsic viscosity, l/g | Gloss, % |
|---|---|---|---|
| 1 | 56.3 | 0.11 | 72 |
| 2 | 84.5 | 0.08 | 76 |
| 3 | 112.6 | 0.06 | 79 |
| 4 | 0 | — | 48 |

We claim:
1. Process for the manufacture of a vinylidene fluoride polymer, comprising:
   a) introducing a chain control agent comprising an alkyl acetate having an alkyl group of 1 to 3 carbon atoms into an aqueous medium; and
   b) non-continuous polymerizing vinylidene fluoride in said aqueous medium in the presence of an initia- tor comprising a peroxydisulphate and in the absence of an emulsifying agent.

2. Process for the manufacture of vinylidene fluoride polymer according to claim 1, wherein said alkyl acetate is ethyl acetate.

3. Process for the manufacture of vinylidene fluoride polymer according to claim 1, wherein said chain control agent is in a proportion of 0.5 to 3% by weight relative to the monomer.

4. Process for the manufacture of vinylidene fluoride polymer according to claim 3, wherein said chain-control agent is in a proportion of 1 to 2% by weight relative to the monomer.

5. Process for the manufacture of vinylidene fluoride polymer according to claim 1, wherein said peroxydisulphate is an alkali metal peroxydisulphate or an ammonium peroxydisulphate.

6. Process for the manufacture of vinylidene fluoride polymer according to claim 5, wherein said peroxydisulphate is ammonium peroxydisulphate.

7. Process for the manufacture of vinylidene fluoride polymer according to claim 1, wherein said initiator is in a proportion of 0.005 grams to 0.5 grams per liter of aqueous phase.

8. Process for the manufacture of vinylidene fluoride polymer according to claim 1, wherein said initiator and said vinylidene fluoride and said monomers are introduced progressively into the aqueous medium in the course of polymerization.

9. In a paint formulation, the improvement comprising at least one vinylidene fluoride polymer obtained according to claim 1.

10. In a process for prelacquering metals, the improvement comprising a formulation including at least one vinylidene fluoride polymer obtained according to claim 1.

11. Process for the manufacture of a vinylidene fluoride polymer, comprising:
   a) introducing a chain control agent comprising an alkyl acetate having an alkyl group of 1 to 3 carbon atoms into an aqueous medium; and
   b) non-continuous polymerizing a mixture of monomers comprising at least 85 mol % of vinylidene fluoride in said aqueous medium in the presence of an initiator comprising a peroxydisulphate and in the absence of an emulsifying agent.

* * * * *